US005644607A

United States Patent [19]
Iwama et al.

[11] Patent Number: 5,644,607
[45] Date of Patent: Jul. 1, 1997

[54] AUTOMATIC REFUELING APPARATUS

[75] Inventors: Kunihiko Iwama, Hitachinaka; Yutaka Kometani, Hitachi, both of Japan

[73] Assignee: Hitachi, Ltd., Tokyo, Japan

[21] Appl. No.: 590,557

[22] Filed: Mar. 21, 1996

[30] Foreign Application Priority Data

Mar. 27, 1995 [JP] Japan .................................. 7-067822

[51] Int. Cl.$^6$ .............................................. G21C 19/18
[52] U.S. Cl. ....................... 376/268; 376/270; 376/258
[58] Field of Search ..................................... 376/258, 264, 376/268, 270, 271

[56] References Cited

U.S. PATENT DOCUMENTS

| | | | |
|---|---|---|---|
| 4,427,623 | 1/1984 | Howard et al. | 376/271 |
| 4,824,633 | 4/1989 | Ichikawa et al. | 376/268 |
| 5,490,185 | 2/1996 | Dent et al. | 376/268 |

FOREIGN PATENT DOCUMENTS 58-19238  4/1983  Japan .

*Primary Examiner*—Daniel D. Wasil
*Attorney, Agent, or Firm*—Antonelli, Terry, Stout & Kraus, LLP

[57] ABSTRACT

An automatic refueling apparatus has a travel carriage, a traverse carriage and a fuel assembly grappling apparatus composed of a grapple, an extension pipe and a hoist. The automatic refueling apparatus also includes a system for controlling automatic fuel transferring operations, in which a calculation unit and a control unit are provided. After the positions of a start point and a target terminal point of a fuel assembly transfer are input through an input device, the calculation unit determines the shortest route from the start point to the terminal point in a preset fuel transferring permitted region, and the control unit generates driving command signals for moving the fuel assembly grappling apparatus along the obtained shortest route through a simultaneous control along X, Y, Z (Z: an elevation direction vertical to a X-Y horizontal plane of the grapple) and θ (a rotation direction in a X-Y horizontal plane of the grapple) axes.

10 Claims, 11 Drawing Sheets

——— : OPERATION WITH LOAD
—·—·— : OPERATION WITH NO LOAD

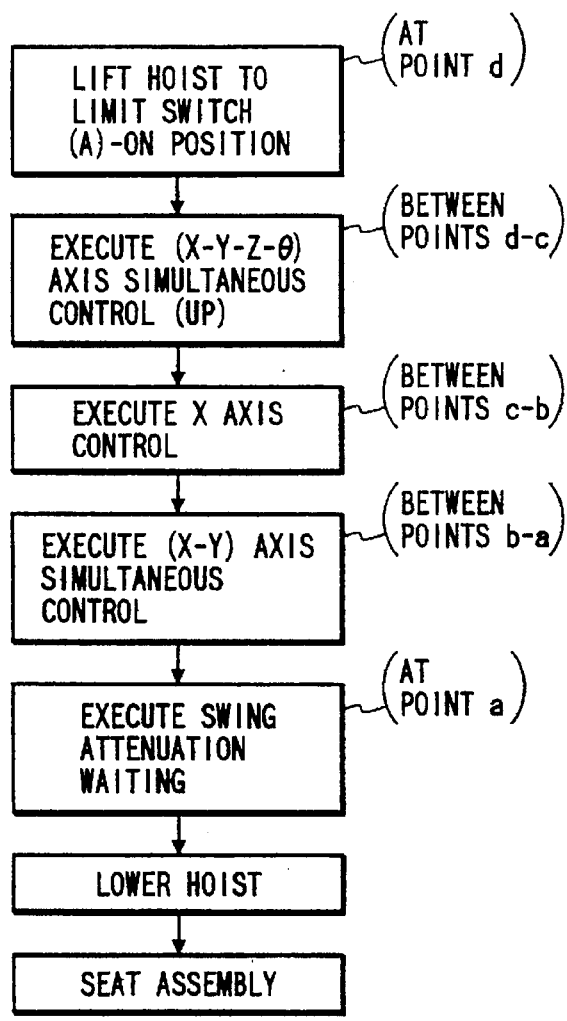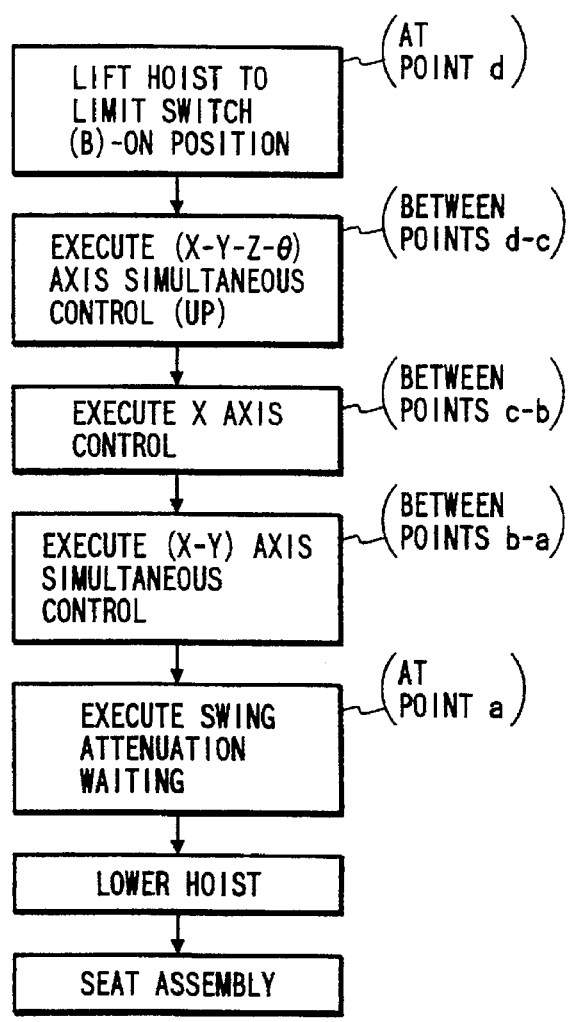

AUTOMATIC REFUELING APPARATUS

BACKGROUND OF THE INVENTION

The present invention relates to an automatic refueling apparatus for a nuclear power plant, especially to an automatic refueling apparatus suitable for transferring a fuel assembly at high speed.

An existing refueling apparatus is manually operated from an operation box provided on a carriage of the refueling apparatus, and a travel motion and a traverse motion are separately carried out.

Further, AEG company in Germany has developed an automatic system for the refueling of a nuclear reactor. However, this is only partially automatic, the operation being dictated by automatic control commands sent from an operator console on a carriage. Further, simultaneous control of travel and traverse motions has not been realized.

Furthermore, in JP-A-19238/1983, there is disclosed a travel and traverse motion simultaneous control system for a refueling in which a carriage moving route from a present position to a target position is automatically calculated for a complicated travel route, and the limits of the traverse region, and speed control commands for travel and traverse motions are obtained and issued. However, in this control system, only the simultaneous control of travel and traverse motions is aimed at, and a more multidimensional simultaneous control, which may reduce the time for refueling, is not considered or provided.

As mentioned above, in the existing techniques, reducing the time for transferring a fuel assembly between a fuel pool and a reactor core is realized by adopting only simultaneous control of travel and traverse motions in two dimensions, and so a multidimensional control taking elevation and rotation of a fuel assembly grappling apparatus into consideration, that is, a X-Y-Z-θ axis simultaneous control, has not been devised for reducing the time of refueling.

SUMMARY OF THE INVENTION

The present invention has been proposed in consideration of the above-mentioned problems, and an objective of the present invention is to provide an automatic refueling apparatus aimed at reducing the time for refueling by realizing a multidimensional simultaneous control.

One of the features of the present invention to attain the above-mentioned objective is to provide an automatic refueling apparatus which is capable of automatically transferring fuel assemblies between a fuel pool and a reactor core in a nuclear power plant, and which has a traveling carriage moving on an X-Y axis on a horizontal plane between a reactor core and a fuel pool in a nuclear power plant, a fuel assembly grappling apparatus which is provided at the traveling carriage and is moved in a Z axis direction perpendicular to the X-Y axis plane, a rotation machine provided at the traveling carriage to rotate the fuel assembly grappling apparatus around the Z axis in a θ direction, and driving means for moving the traveling carriage, the fuel assembly grappling apparatus and the rotation machine in each of X, Y, Z and θ directions, the automatic refueling apparatus comprising:

input means for inputting positions of a start point and a target terminal point in a fuel assembly transferring operation, position detection means for detecting a position of the fuel assembly grappling apparatus along X-Y-Z-θ coordinates, calculation means for taking in outputs of the input means and for obtaining the shortest route between the start point and the target terminal point through a preset fuel transferring permitted region, and control means for generating control command signals to move the fuel assembly grappling apparatus along the obtained shortest route based on outputs of the position detection means and for sending the control command signals to the driving means.

Another feature of the present invention is to provide means for storing the coordinates and an indication of the presence of a fuel assembly for each lattice of a fuel rack in the fuel pool, and the coordinates and an indication of the presence of a fuel assembly for each fuel cell of the reactor core, in the automatic refueling apparatus.

Another feature of the present invention relates to the fact that a fuel assembly transferred by the automatic refueling apparatus passes not less than one point prescribed in the shortest route set in advance in the preset fuel transferring permitted region.

Further another feature of the present invention relates to the fact that the control means of the automatic refueling apparatus selects one of the prepared control modes corresponding to intervals obtained by dividing the shortest route between the start point and the target terminal point, each interval being designated by preset points.

With the automatic refueling apparatus, the calculation means judges whether the present position of the fuel assembly grappling apparatus is in an area where X-Y-Z-θ axis simultaneous control is possible in the preset fuel transferring permitted region, based on the detected present position of the fuel assembly grappling apparatus, and if the grappling apparatus enters the above-mentioned area, the control means selects the X-Y-Z-θ axis simultaneous control mode and sends the control command signals of the four-dimensional control mode to the driving means. By executing the above-explained controls, it is possible to transfer a fuel assembly by the shortest route between the start point and the target terminal point.

BRIEF DESCRIPTION OF THE DRAWINGS

FIG. 6(a) is a flow chart of the controlling operations for transferring the fuel assembly from the reactor core into the fuel pool.

FIG. 6(b) is a flow chart of the controlling operations for moving the fuel assembly grappling apparatus from the reactor core to the fuel pool to take out a fuel assembly.

DETAILED DESCRIPTION OF THE EMBODIMENTS

Figure 1:
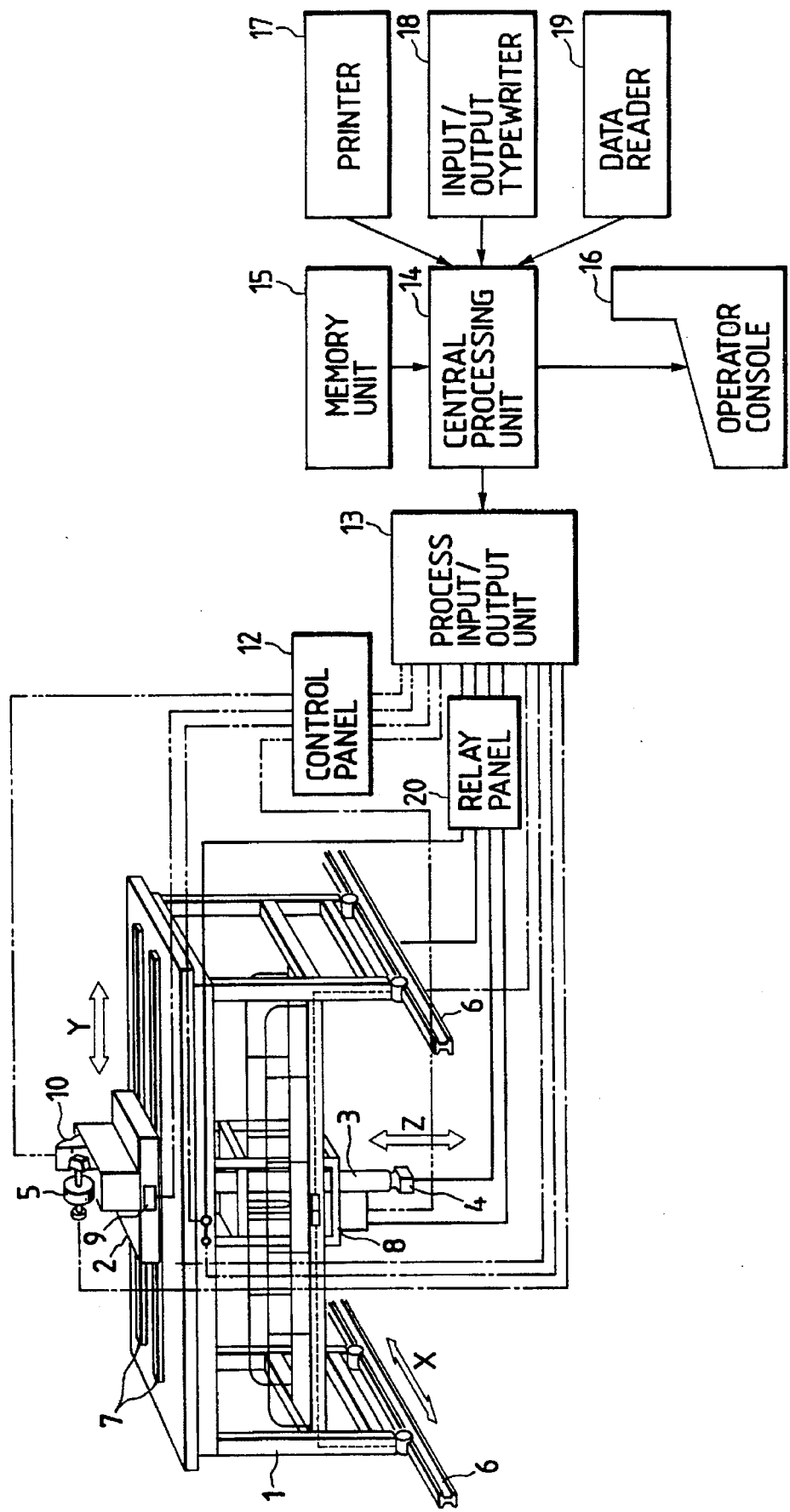
FIG. 1 is a schematic diagram of an embodiment of an automatic refueling apparatus of the present invention.
Figure 2:
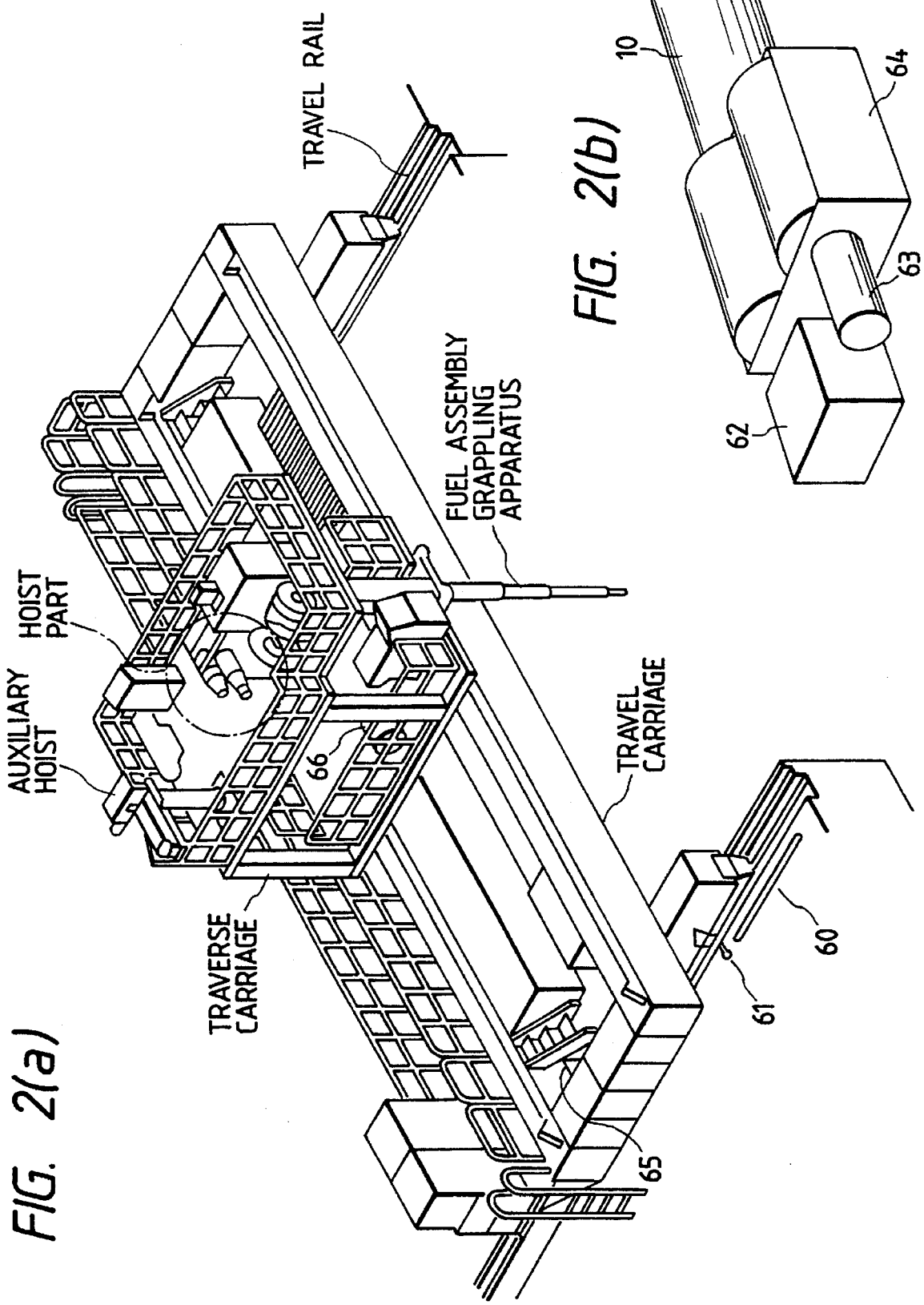
FIG. 2(a) is a perspective view of the apparatus shown in FIG. 1, in which the arrangement of position sensors used in the embodiment is shown.
FIG. 2(b) is an enlarged fragmentary view showing the hoist part illustrated in FIG. 2(a).

Hereinafter, details of the present invention will be explained with reference to embodiments shown in the drawings.

Figure 8A:
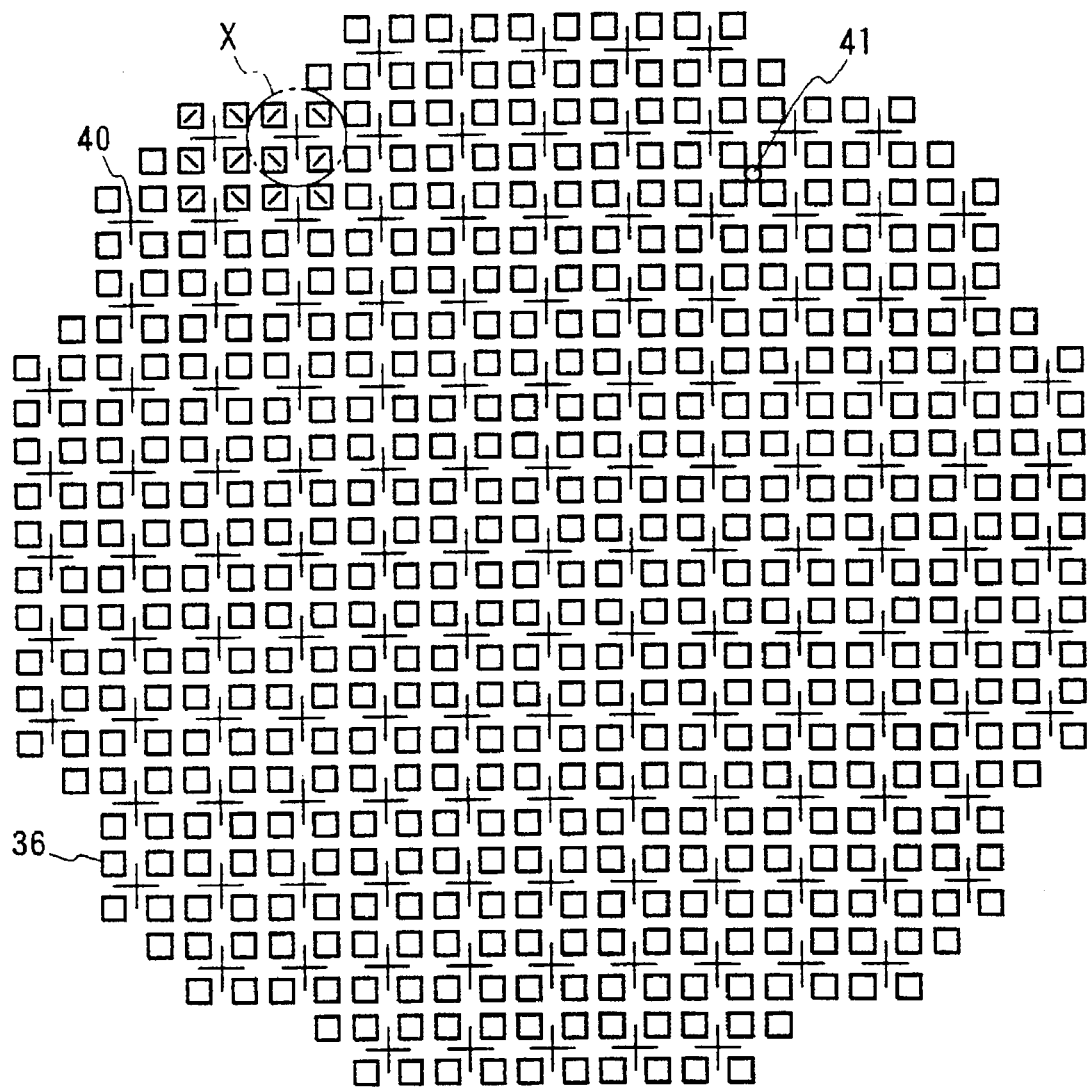
FIG. 8(a) is a transverse cross-sectional view for explaining a composition of the core of a boiling water reactor.

FIG. 8(a) is a transverse cross-sectional view for explaining a composition of the core of a boiling water reactor. In the figure, there is shown fuel assemblies 36, control rods 40 and LPRMs (Local Power Range Monitors) 41, respectively.

Figure 8B:
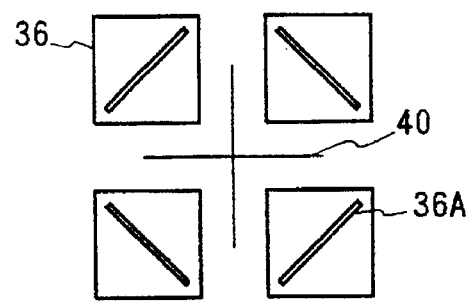
FIG. 8(b) is an enlarged fragmentary view showing the X part illustrated in FIG. 8(a).

And, as shown in FIG. 8(b), four bundles of fuel assemblies around one control rod 40 compose a fuel cell. A handle 36A of the bundle 36 faces the control rod 40 at an angle of 45 degrees.

Since the reactivity of a reactor core continues to decrease during operations of a nuclear reactor, it is necessary for old fuel assemblies to be periodically exchanged with new fuel assemblies. And, the period between the fuel exchanges is called an operation cycle, the old and the new fuel assemblies being exchanged at the end of each operation cycle. In a nuclear power plant of 1100 MWe class, about 800 bundles of fuel assemblies are loaded in a reactor core, and one fourth to one third of all loaded fuel assemblies have to be exchanged in every regular inspection. Since the fuel assembly exchange (refueling) work is the critical part in a regular inspection, reduction of the time of refueling gives rise to reduction in the number of days required for the regular inspection, and furthermore improves the availability factor of the nuclear power plant.

In the following, an existing refueling apparatus will be explained.

Figure 9:
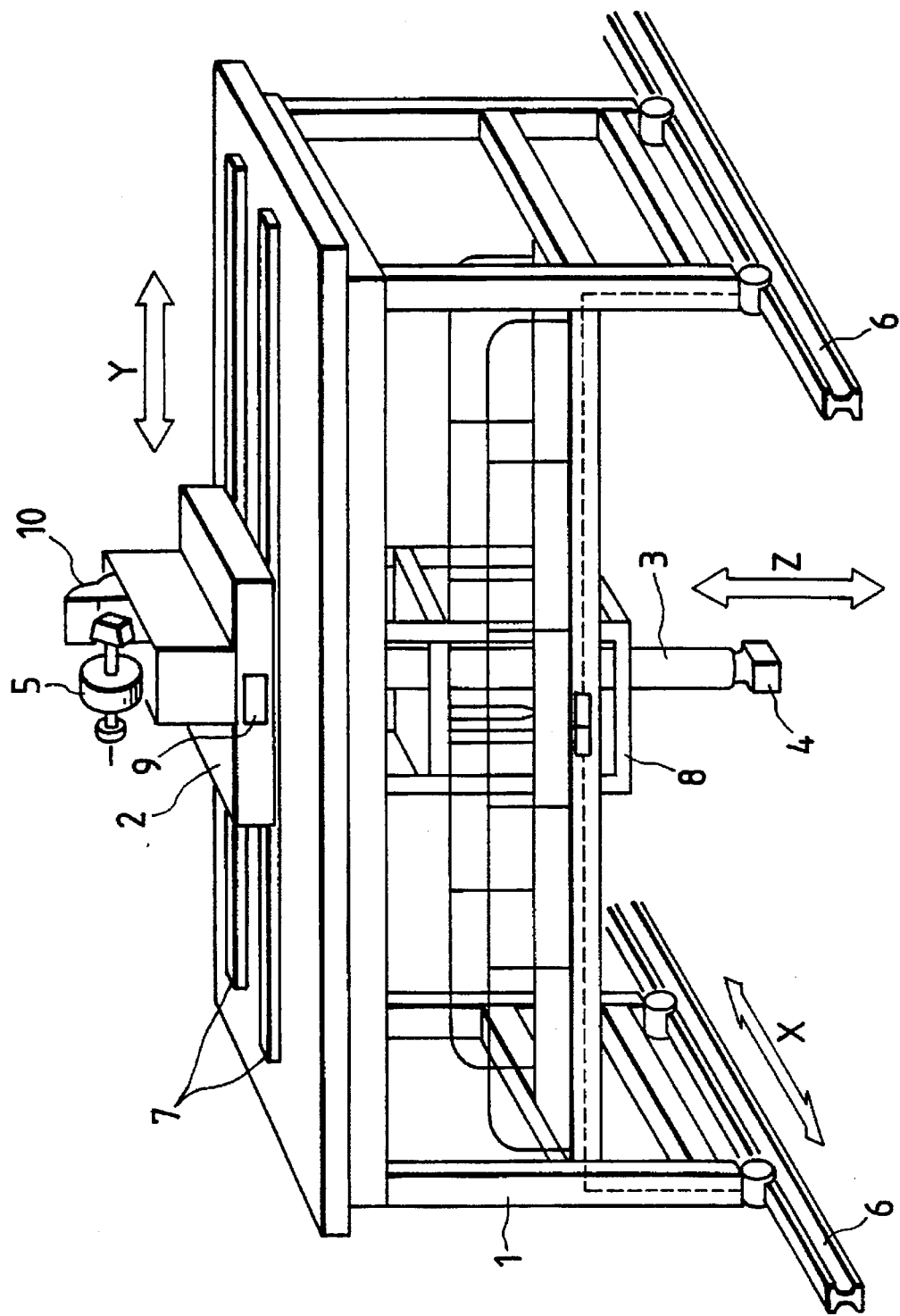
FIG. 9 is a perspective view showing an example of the composition of a refueling apparatus.
Figure 11:
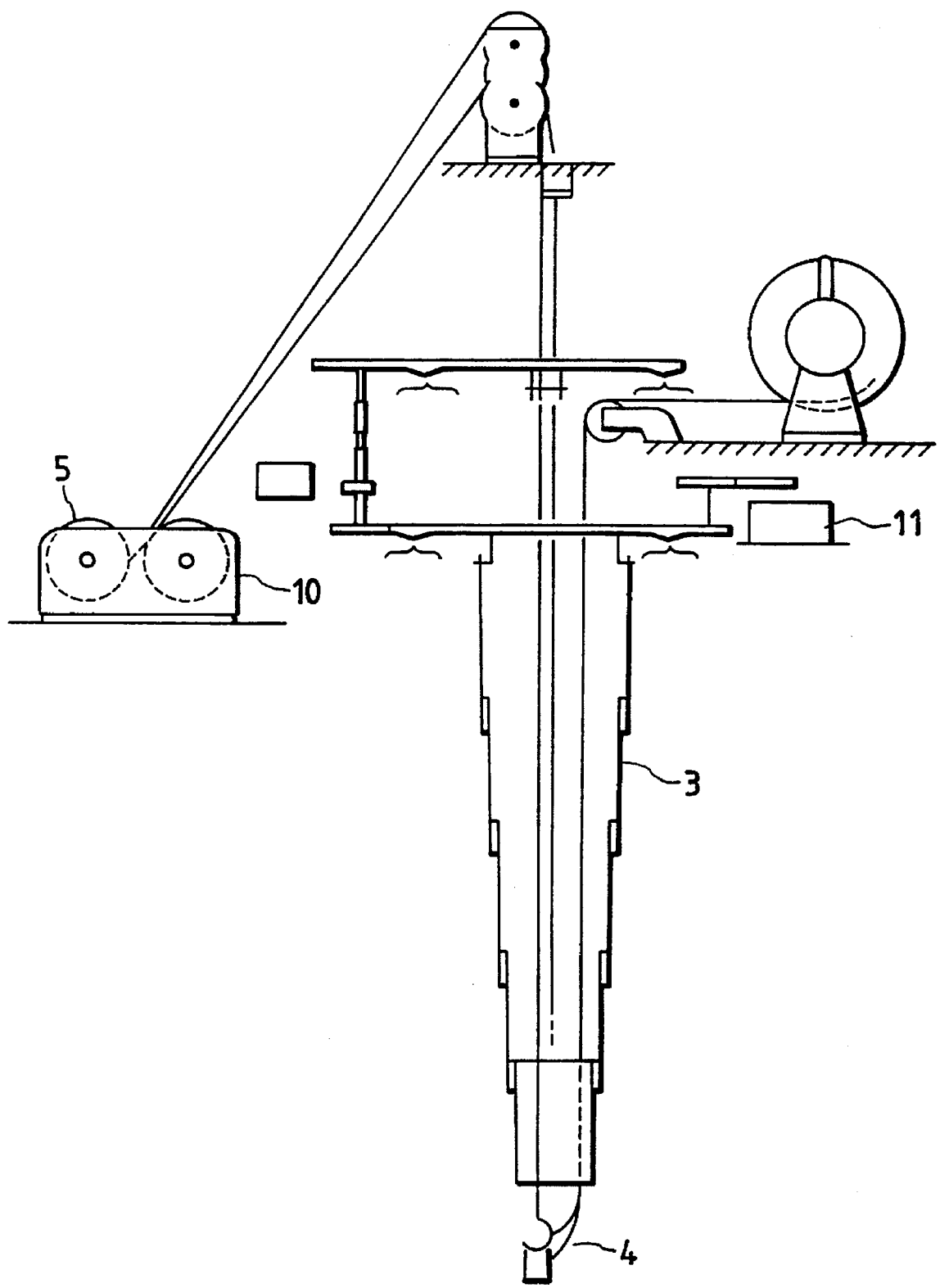
FIG. 11 is a diagram which shows the composition of a fuel assembly grappling apparatus in an existing automatic refueling apparatus.

First, an example of an existing refueling apparatus and the composition of a fuel assembly grappling apparatus are shown in FIGS. 9 and 11, respectively.

The refueling apparatus shown in FIG. 9 consists of main parts of a travel carriage 1, a traverse carriage 2, an extension pipe 3, a grapple 4 and a hoist 5. And, as shown in FIG. 11, the fuel assembly grappling apparatus is composed of the extension pipe 3, the grapple 4, and grapple driving motors 10 and 11.

The travel carriage 1 is moved by a driving motor 8 on a pair of rails 6 provided at the side parts of each one of a fuel pool 32 and a reactor core pool 30, which will be explained later.

The traverse carriage 2 including the grapple 4, the extension pipe 3 and the hoist 5, is moved by a driving motor 9 on a pair of rails 7 provided on the travel carriage 1.

The grapple 4 is lifted and lowered by the hoist 5, and rotated around the vertical axis by a driving motor 11 for adjusting the angle of a grappled fuel assembly.

Further, the grapple 4 is attached at the bottom of the extension pipe 3. Hereafter, the moving directions of the travel carriage 1 and the traverse carriage 2, the elevating direction of the grapple 4, and the rotating direction of the grapple 4, will be referred to as the x, Y, Z and θ directions, respectively.

Figure 10:
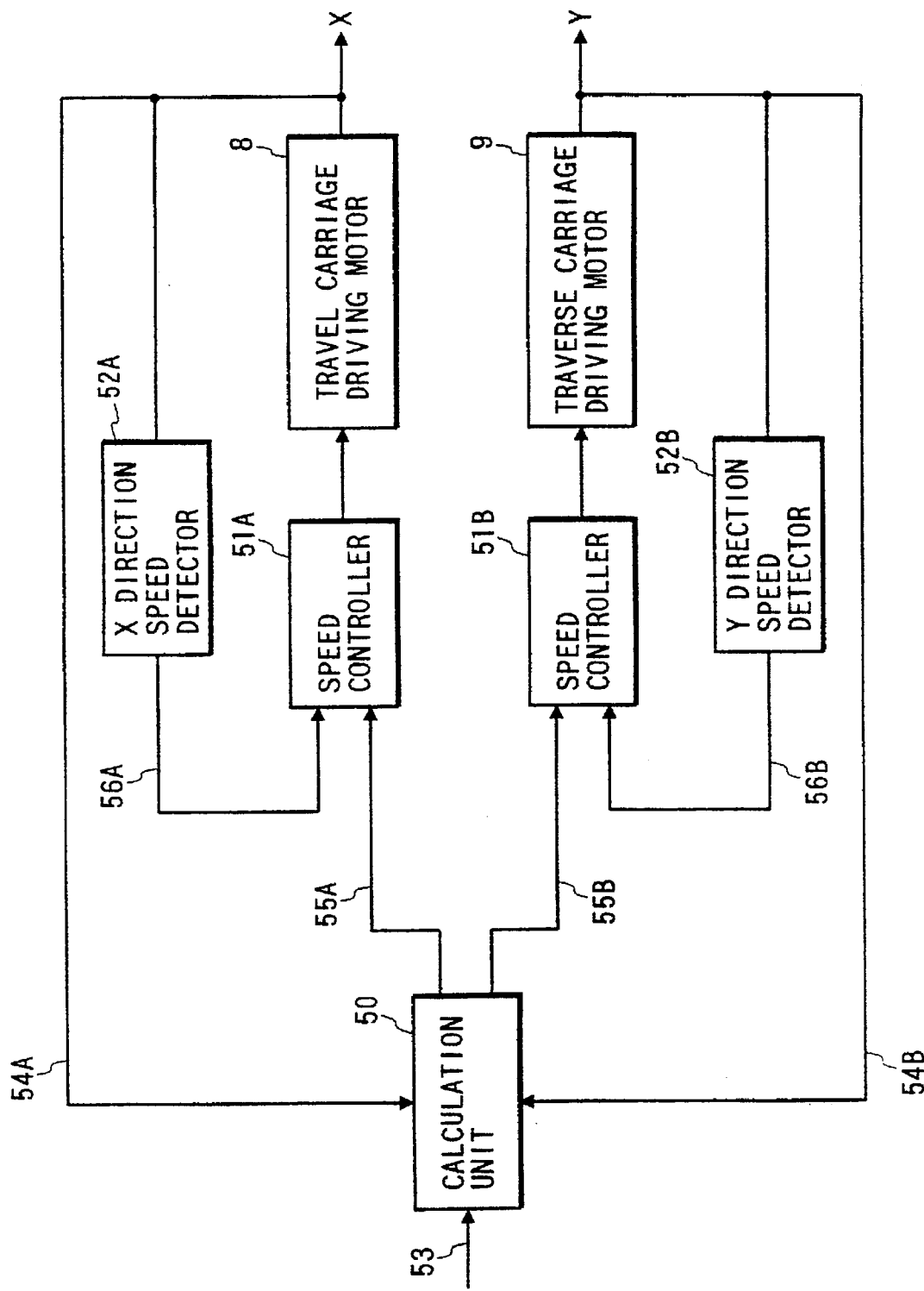
FIG. 10 is a block diagram showing the electrical composition of a traverse carriage part in an existing automatic refueling apparatus.

The travel carriage 1, the traverse carriage 2 and the hoist 5 of the refueling apparatus are driven by the direct current motors, and the motions in the x-Y directions are controlled by a control system having a calculation unit as shown in FIG. 10.

The control system of the existing refueling apparatus shown in FIG. 10 is composed of the travel carriage driving motor 8, the traverse carriage driving motor 9, the calculation unit 50, speed controllers 51A and 51B and speed sensors 52A and 52B. In the figure, there are also shown a signal for instructing the target position of fuel assembly transfer 53, position signals 54A and 54B representing the positions of the carriages 1 and 2, speed control signals 55A and 55B, and speed signals 56A and 56B.

An operator inputs the destination ID address in a fuel pool or a reactor core for a fuel assembly to be transferred as the signal for instructing the target position of fuel assembly transfer 53, into the calculation unit 50.

The calculation unit 50 takes in a signal representing the present position $X_1$ (position signal 54A) of the travel carriage 1, and a signal representing the present position $Y_1$ (position signal 54B) of the traverse carriage 2, and calculates each of the speed control signals 55A and 55B for the travel and the traverse carriages 1 and 2, based on a relation between each present position and the target position, and then inputs the calculated speed control signals 55A and 55B to the speed controllers 51A and 51B.

The speed controller 51A (51B) compares the speed control signal 51A (51B) with the sensed speed signal 56A (56B) and further generates the speed control signal 51A (51B) for controlling the voltage in a control circuit of the direct current motor for the travel carriage 1 (the traverse carriage 2) so that the difference between the speed control signal and the sensed speed signal is reduced to zero, and then the positioning of a transferred fuel assembly is accomplished by continuous control operations of the carriages 1 and 2.

In the above-explained existing control method, the X-Y simultaneous control is adopted for reducing the time of fuel transfer between the present position and the target position, but reducing the time of fuel transfer by executing a multidimensional control including Z-θ simultaneous control is not considered.

In the following, an automatic refueling apparatus forming an embodiment of the present invention will be explained, by referring to FIG. 1–FIG. 4.

The composition of an automatic refueling apparatus including a control system is shown in FIG. 1. Position signals indicating position change amounts in the X, Y, Z and θ directions are sensed by synchro transmitters, each of which is provided for a respective driving axis (not shown in a figure), and the signal are input to a process input/output unit 13.

The process input/output unit 13 converts the position signals to digital signals, and outputs them to a computer, namely, a central processing unit 14.

The central processing unit 14 calculates the moving amounts in the X, Y, Z and θ directions by comparing the present position with the target position, which has been given by a demand of an operator via an operator console 16, and generates control signals based on the calculated moving amounts and sends them to the driving motors 8, 9, 10 and 11 via the process input/output unit 13 and a control panel 12. FIG. 2(a) is a perspective view of the apparatus, in which the arrangement of position sensors used in the embodiment is shown. And, FIG. 2(b) is an enlarged fragmentary view showing the hoist part 5 illustrated in FIG. 2(a), which shows also the arrangement of position sensors attached at the hoist part 5. The position sensing system shown in FIGS. 2(a) and 2(b) includes an actuator 60 for detecting the position of the travel carriage 1, a limit switch 61 for detecting the position of the travel carriage 1, a limit switch 62 for detecting the elevation position of the grapple 4, a synchro transmitter 63 for indicating the elevation position of the grapple 4, a synchro transmitter 65 for detecting the position of the travel carriage 1, a synchro transmitter 66 for detecting the position of the traverse carriage 2, and a hoist 64 for elevating the fuel assembly grappling apparatus.

The computer system used in the control system is composed of the central processing unit 14, the process input/output unit 13, the operator console 16, and peripheral devices, such as a memory unit 15, an input/output typewriter 18, a printer 17, a data reader 19 and so forth.

Figure 3:
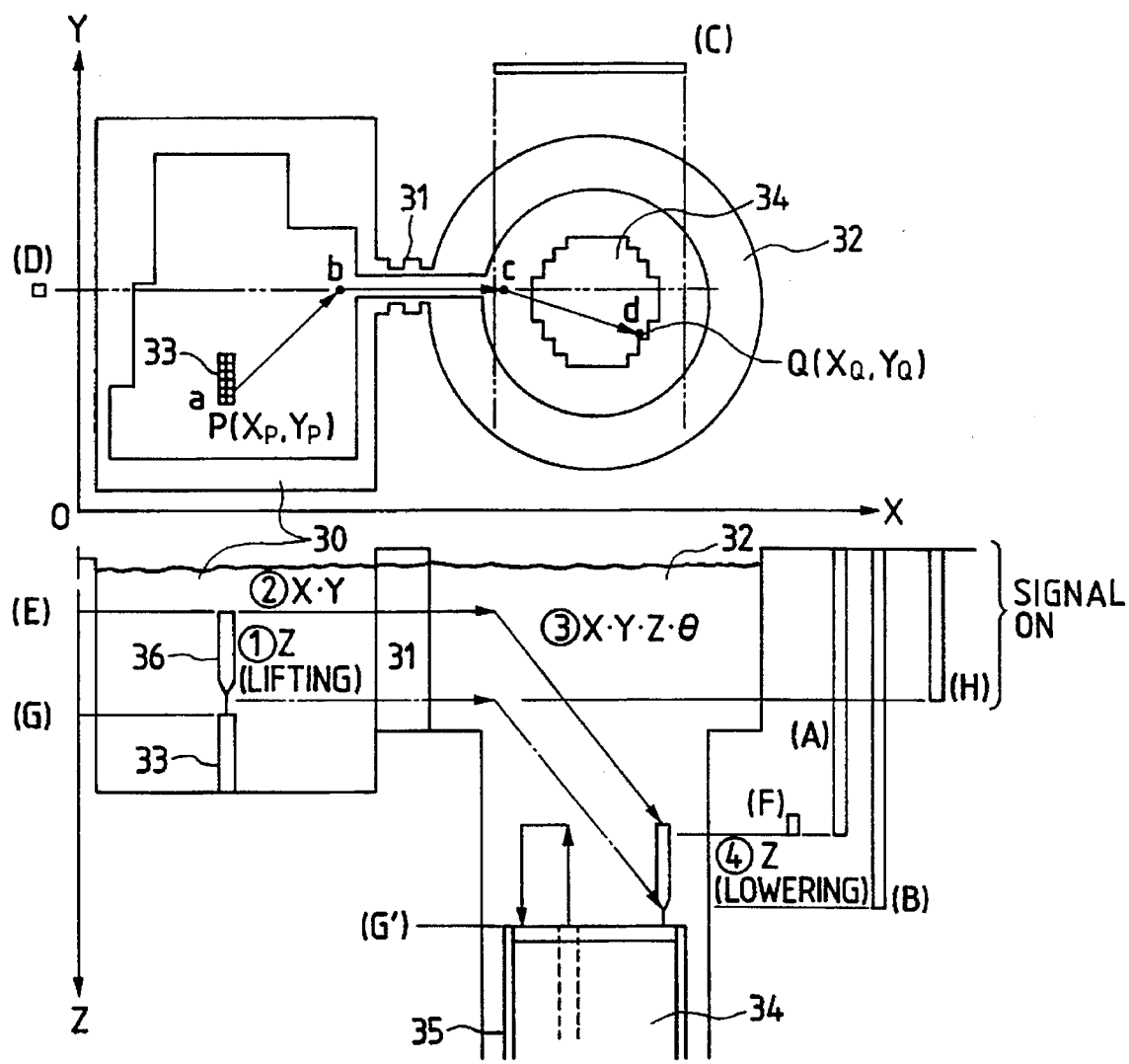
FIGS. 3 and 4 are diagrams for explaining the outline of the control method used in the embodiment, which represent a plan view of the highest floor of and a vertical cross-sectional view of a reactor building, respectively.

Through the relay panel 20 and the process input/output unit 13, the central processing unit 14 takes in information indicating the position of the automatic refueling apparatus shown in FIG. 3, that is, the position in the X direction over a reactor core region, detected by detection means, such as a limit switch (c), (located in the interval between two chain double-dashed lines parallel to the Y axis shown in FIG. 3), the gate position through which the traverse carriage 2 passes, (the Y coordinate value of a chain double-dashed line parallel to the X axis, passing through the fuel pool 31, a gate 30 and the reactor core pool 32), detected by detection means, such as a limit switch (D), the upper limit position of the grapple 4 detected by detection means, such as a limit switch (E), an intermediate position detected by detection means, such as a limit switch (F), the seating position of a fuel assembly in the fuel pool, detected by detection means, such as a limit switch (G), the seating position of a fuel assembly in the reactor core, detected by detection means, such as a limit switch (G'), the position permitted for the travel and traverse motions during operations without a load in the fuel pool, detected by detection means, such as a limit switch (H), the position permitted for the travel and traverse motions during operations without a load in the reactor core, detected by detection means, such as a limit switch (B), and the position permitted for the travel and traverse motions during operations with a load in the reactor core, detected by detection means, such as a limit switch (A). Then, the central processing unit 14 controls the positioning of a fuel assembly to be transferred and monitors the fuel assembly transferring operations. Meanwhile, the Z coordinate value indicates the bottom position of the grapple 4.

In the following, automatic operations in the refueling work, to which the present invention is applied, will be explained in detail with reference to FIG. 3-FIGS. 6(a) and 6(b).

Figure 4:
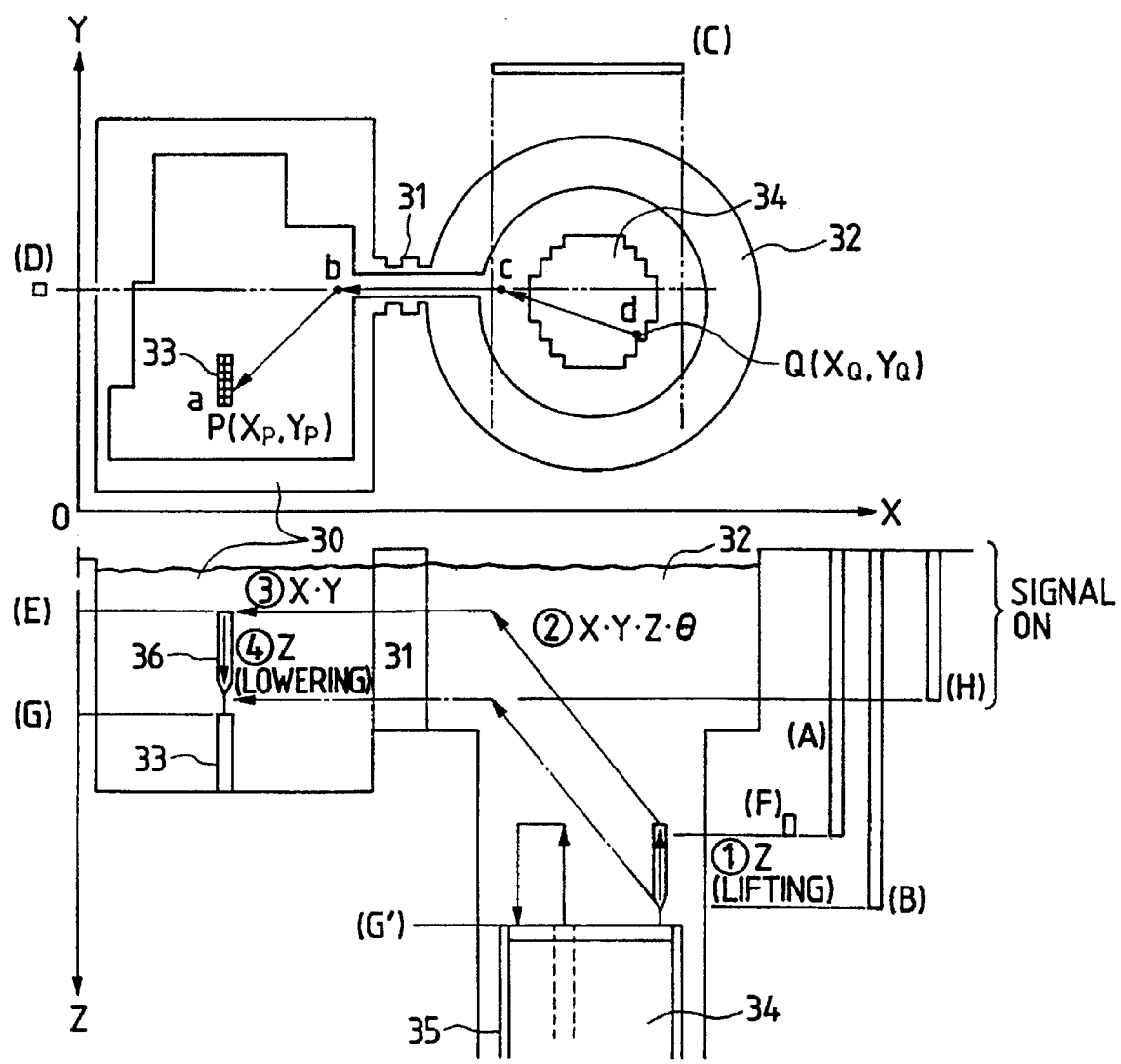

As shown in FIGS. 3 and 4, the automatic refueling apparatus is installed at a region over both the fuel pool 30 and the reactor core pool 32, and is moved between both pools. When the refueling is carried out, the gate 31 is opened, and the space over both of the pools and the gate part is filled with water. In the fuel pool 30, a fuel assembly rack 33 is provided.

Usually, the fuel assembly exchanging operations are carried out between the fuel assembly rack 33 and the reactor core 34. For this purpose, the coordinate values, data indicating the presence of a fuel assembly and data of an assembly positioning angle, for each lattice of the fuel assembly rack 33, or for each cell of the reactor core 34, are stored in the computer system.

By referring to FIG. 3, FIGS. 5(a) and 5(b), the fuel assembly exchanging operations will be explained for a case in which a fuel assembly is transferred from a position P at the fuel assembly rack 33 to a position Q at the reactor core 34.

Let the coordinates of the present position P and the target terminal position Q be $(X_P, Y_P, Z_P, \theta_P)$ and $(X_Q, Y_Q, Z_Q, \theta_Q)$, respectively.

At first, an operator inputs a pair of ID numbers $IQ_X$ and $IQ_Y$ in the X and Y directions corresponding to the coordinates $(X_Q, Y_Q)$ of the target position Q, using the operator console 16. Then, the operator commands the computer system to judge the possibility of starting the required automatic operations, that is, the required fuel assembly transfer.

If an automatic start is permitted, the operator initiates automatic start by pushing a button for starting the automatic operations. Then, after the required fuel assembly is grappled, a Z direction lifting control ① is first executed, and then the grappled fuel assembly is temporally stopped at the upper limit position detected by the limit switch (E).

Then, a X-Y simultaneous control ② is executed. In the X-Y simultaneous control, the shortest route (P→b→c) for the prescribed points b and c, is calculated, and the computer system outputs control signals for controlling the motions in the x and y directions of the two carriages so that the grapple 4 moves along the calculated route (P→b→c). That is, in turn for the intermediate target points b and c, the deviations of the present position from each intermediate target point ΔX and ΔY are calculated. Then, a constant speed control is executed for the direction corresponding to a larger deviation, and a deviation ratio (ΔX/ΔY or ΔY/ΔX) speed control is executed for the direction corresponding to a smaller deviation. Further, when the grapple 4 reaches the prescribed point c and the limit switch (C) is turned on, the X-Y-Z-θ simultaneous control ③ is started. In the angle θ control, an angle control signal is obtained based on the deviation of the angle $\theta_P$ from the angle $\theta_Q$, and is output to the driving means. In the lowering control of the X-Y-Z-θ simultaneous control ③, the lowering of a fuel assembly is continued until the limit switch (A) for detecting the position permitted for the travel and traverse motions during operations with a load in the reactor core is turned off.

Then, the lowering of the grapples 4 is stopped at the point where the limit switch (A) is turned off, and the control system executes a swing attenuation waiting control in which the grapple motion is stopped for a predetermined time to wait for the swing attenuation of the transferred fuel assembly 36. After finishing the swing attenuation control, a Z direction lowering control ④ is executed, and the transferred fuel assembly 36 is inserted into the reactor core 34 and the bottom of the grapple 4 is stopped at the seating position of a fuel assembly cell in the reactor core, detected by a limit switch (G').

Figure 5A:
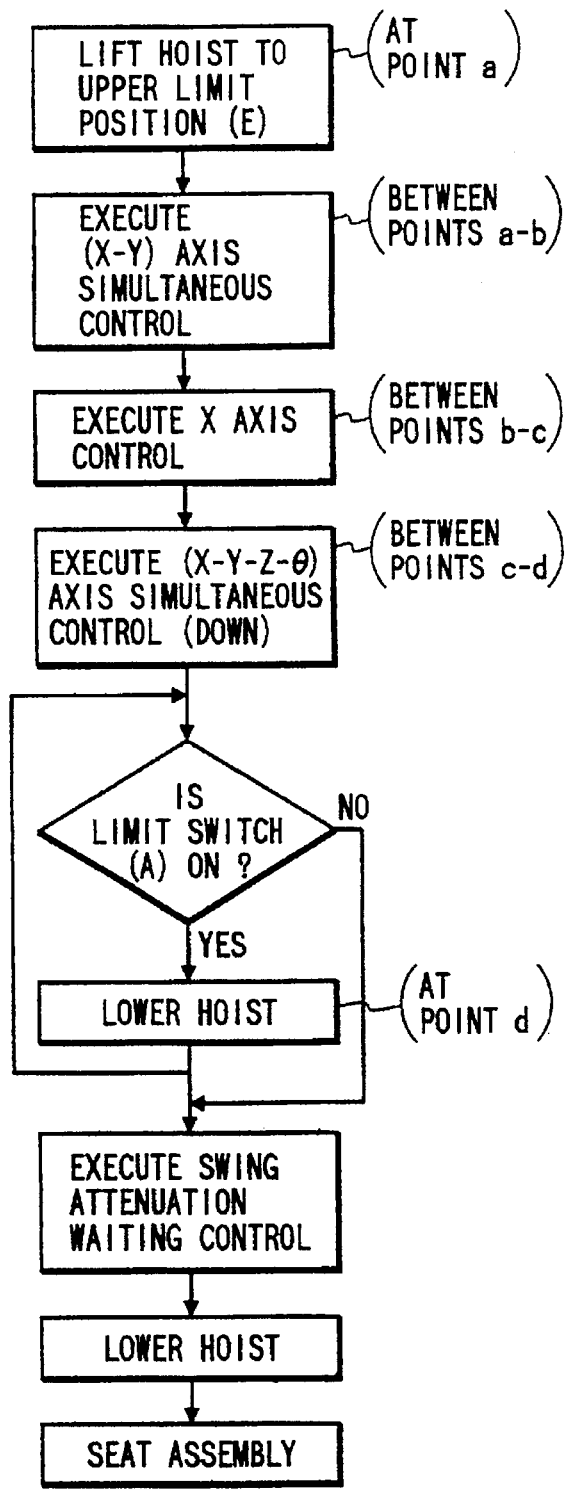
FIG. 5(a) is a flow chart of the controlling operations for transferring a fuel assembly from a fuel pool into a reactor core.
Figure 5B:
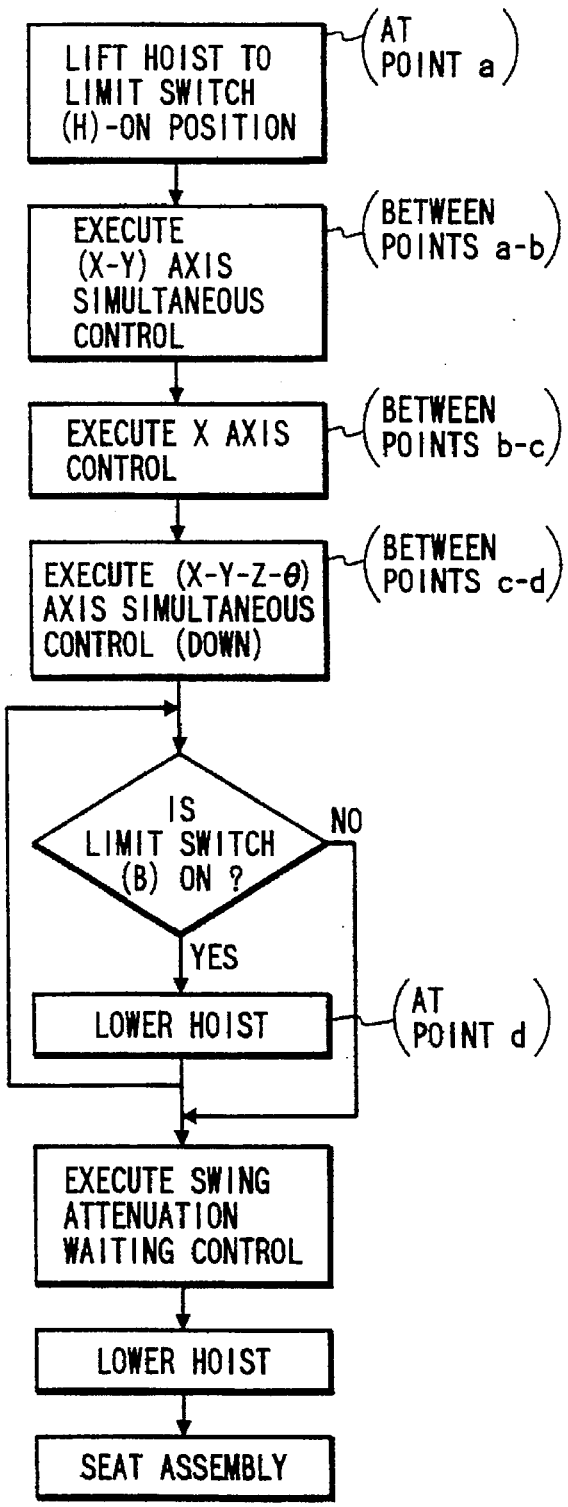
FIG. 5(b) is a flow chart of the controlling operations for moving a fuel assembly grappling apparatus from the fuel pool to the reactor core to take out a fuel assembly.

FIG. 5(a) is a flow chart of the controlling operations for transferring the fuel assembly 36 held by the grapple 4 from the fuel pool 30 into the reactor core 34. And, FIG. 5(b) is a flow chart of the controlling operations for moving the fuel assembly grappling apparatus without a fuel assembly from the fuel pool 30 to the reactor core 34 to take out a fuel assembly.

Next, the operations for transferring fuel assembly 36 from the reactor core 34 to the fuel pool 30, will be explained by referring to FIG. 4, FIGS. 6(a) and 6(b). FIG. 6(a) is a flow chart of the controlling operations for transferring the fuel assembly 36 held by the grapple 4 from the reactor core 34 into the fuel pool 30. FIG. 6(b) is a flow chart of the controlling operations for moving the fuel assembly grappling apparatus without a fuel assembly from the reactor core 34 to the fuel pool 30 to take out fuel assembly.

In the following, the fuel assembly exchanging operations will be explained for a case wherein a fuel assembly is transferred from a position Q at the reactor core 34 to a position P at the fuel assembly rack 33. Let the coordinates of the present position Q of the grapple 4 and the target terminal position P be $(X_Q, Y_Q, Z_Q, \theta_Q)$ and $(X_P, Y_P, Z_P, \theta_P)$, respectively.

At first, an operator inputs a pair of ID numbers $IP_X$ and $IP_Y$ in the X and Y directions corresponding to the coordinates $(X_P, Y_P)$ of the target position P, using the operator console 16. Then, the operator commands the computer system to judge for the possibility of starting the required automatic operations, that is, the required fuel assembly transfer. If the automatic start is permitted, the operator initiates automatic start by pushing a button for starting the automatic operations. Then, after the required fuel assembly is grappled, a Z direction lifting control ① is first executed, and then the grappled fuel assembly is temporally stopped at the upper limit position detected by the limit switch (A).

Then, a X-Y-Z-θ simultaneous control ② is executed. In the X-Y-Z-θ simultaneous control, the shortest route (Q→c) for the prescribed point c is calculated, and the computer system outputs control signals for controlling the motions in the x, y, z and θ directions of the grapple 4 so that the grapple moves along the calculated route (Q→c). That is, for the intermediate target point c, the deviations of the present position from the intermediate target point c, ΔX and ΔY are calculated. Then, a constant speed control is executed for the direction corresponding to a larger deviation, and a deviation ratio (ΔX/ΔY or ΔY/ΔX) speed control is executed for the direction corresponding to a smaller deviation. Further, at the same time that the x-y control is started, the X-Y-Z-θ simultaneous control is started.

In the angle θ control, an angle control signal is obtained based on the deviation of the angle $\theta_Q$ from the angle $\theta_P$, and is output to the driving means.

Then, a X-Y simultaneous control ③ is executed. In the X-Y simultaneous control, the shortest route (c→b→P) for the prescribed points b and c is calculated, and the computer system outputs control signals for controlling the motions in the x and y directions of the two carriages so that the grapple 4 moves on the calculated route (c→b→P).

After finishing the X-Y control, the control system executes a swing attenuation waiting control. When the swing attenuation control is completed, a Z direction lowering control ④ is executed, and the transferred fuel assembly 36 is inserted into the fuel assembly rack 33 and the bottom of the grapple 4 is stopped at the seating position of a fuel assembly in the fuel pool, detected by a limit switch (G).

As mentioned above, in the automatic fuel assembly transferring control, the control modes ①-④ are cyclically carried out.

Further, the following control pattern is also carried out in the above cyclic control, that is, a control pattern of operations for moving the automatic refueling apparatus from the fuel pool 30 to the reactor core 34 to take out a fuel assembly 36 from the reactor core. This control pattern is executed in accordance with the control flow as shown in FIG. 5(b).

Figure 7:
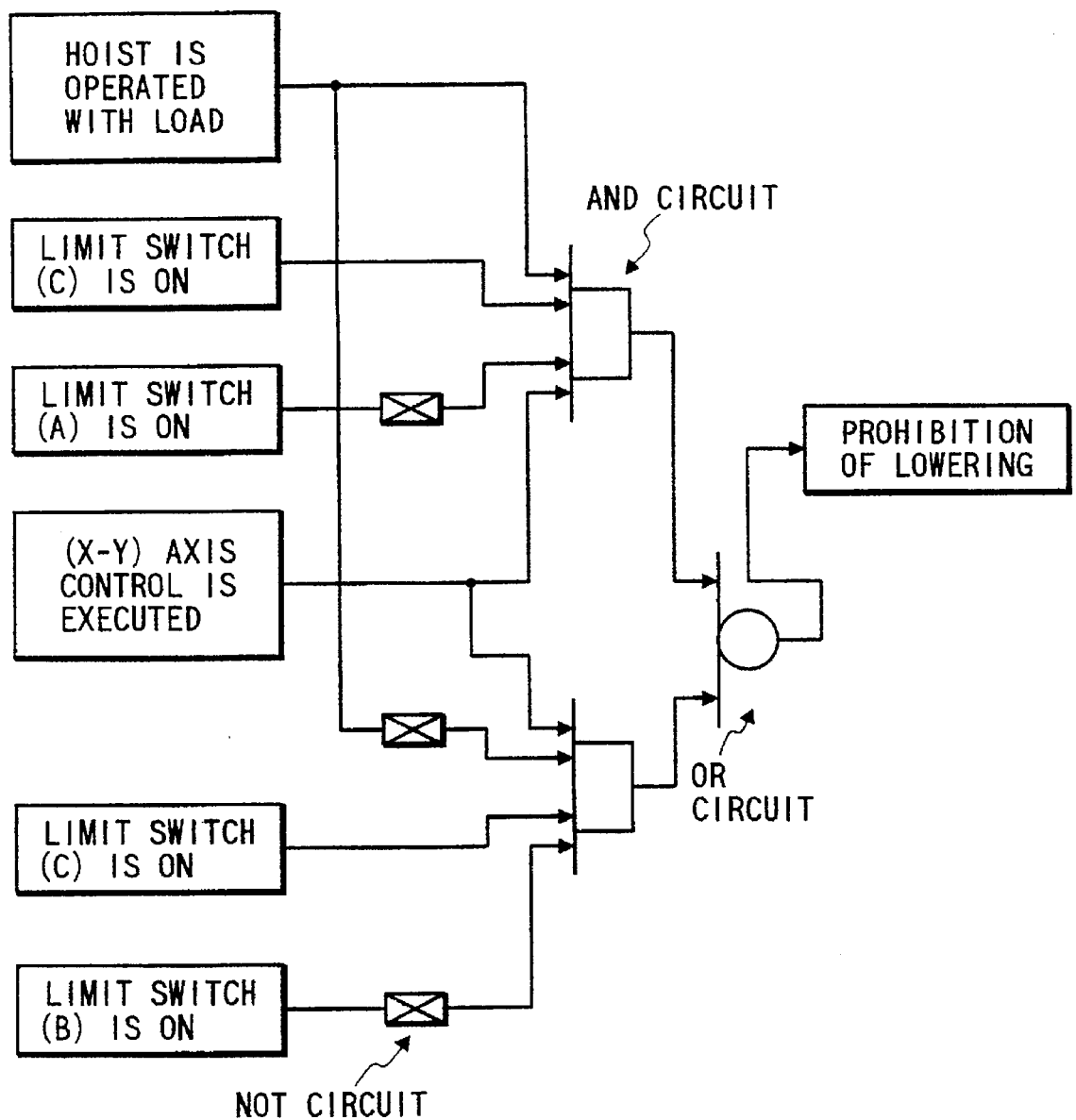
FIG. 7 is a block diagram showing a logic arrangement for prohibiting the motion of the fuel assembly grappling apparatus beyond a limit predetermined corresponding to control situations within a preset fuel transferring permitted region.

And, as safety countermeasures, a prohibition logic against the moving of the grapple 4 in the X, Y and Z directions, as shown in FIG. 7, is also provided in the embodiment.

Therefore, with the embodiment, X, Y, Z and θ axis simultaneous control can be safely executed, which can further considerably reduce the time for refueling.

Furthermore, the same control method as mentioned above can be also applied to an automatic refueling apparatus with a fuel assembly grappling apparatus capable of holding a plurality of fuel assemblies. Such an automatic refueling apparatus also greatly improves the reduction of the refueling time.

Thus, since the four-dimensional X, Y, Z and θ axis simultaneous control is made possible for the operations of transferring and taking out a fuel assembly in the fuel pool or the reactor core, by using the present invention, the time of 70 s for every fuel assembly exchanging operation cycle requiring about 10 m can be saved, which also equals a saving of one day for a 12-day refueling operation presently required in a regular inspection of a 1100 WMe class of a Boiling Water Reactor.

What is claimed is:

1. An automatic refueling apparatus for automatically transferring fuel assemblies between a fuel pool and a reactor core in a nuclear power plant, having a traveling carriage moving on an X-Y axis in a horizontal plane between the reactor core and the fuel pool in said nuclear power plant, a fuel assembly grappling apparatus provided at said traveling carriage and moved in a Z axis direction perpendicular to said X-Y axis horizontal plane, a rotation machine provided at said traveling carriage to rotate said fuel assembly grappling apparatus around said Z axis in a θ direction, and driving means for moving said traveling carriage, said fuel assembly grappling apparatus and said rotation machine in each of said X, Y, Z and θ directions, said automatic refueling apparatus comprising:

input means for inputting information representing positions of a start point and a target terminal point in a fuel assembly transferring operation;

position detection means for detecting a position of said fuel assembly grappling apparatus along said X-Y-Z-θ coordinates;

calculation means responsive to outputs of said input means for determining the shortest route between said start point and said target terminal point through a preset fuel transferring permitted region; and control means for generating control command signals to move said fuel assembly grappling apparatus along said obtained shortest route based on outputs of said position detection means, and for sending said control command signals to said driving means.

2. An automatic refueling apparatus according to claim 1, further comprising means for storing coordinates and an indication of the presence of a fuel assembly for each lattice of a fuel rack in said fuel pool, and coordinates and an indication of the presence of a fuel assembly for each fuel cell of said reactor core.

3. An automatic refueling apparatus according to claim 1, wherein said control means includes means for controlling motions of said fuel assembly grappling apparatus so as to pass not less than one predetermined point in said preset fuel transferring permitted region.

4. An automatic refueling apparatus according to claim 3, wherein said control means includes means of selecting one of plural prepared control modes corresponding to intervals obtained by dividing said shortest route between said start point and said target terminal point, each interval being designated by predetermined points.

5. An automatic refueling apparatus according to claim 1, wherein said position detection means includes limit switches provided at boundaries of said preset fuel transferring permitted region.

6. An automatic refueling apparatus according to claim 1 or 5, further comprising prohibition means for prohibiting a transferred fuel assembly from moving beyond the boundaries of said preset fuel transferring permitted region based on information of said position detection means.

7. An automatic refueling method for automatically transferring fuel assemblies between a fuel pool and a reactor core in a nuclear power plant, using a traveling carriage moving on an X-Y axis in a horizontal plane between the reactor core and the fuel pool in said nuclear power plant, a fuel assembly grappling apparatus provided at said traveling carriage and moved in a Z axis direction perpendicular to said X-Y axis horizontal plane, a rotation machine provided at said traveling carriage to rotate said fuel assembly grappling apparatus around said Z axis in a θ direction, and driving means for moving said traveling carriage, said fuel assembly grappling apparatus and said rotation machine in each of said X, Y, Z and θ directions, said automatic refueling method comprising the steps of:

inputting information representing positions of a start point and a target terminal point in a fuel assembly transferring operation;

detecting a position of said fuel assembly grappling apparatus along said X-Y-Z-θ coordinates;

reading out said input positions of said start point and said target terminal point;

determining the shortest route between said start point and said target terminal point through a preset fuel transferring permitted region;

generating control command signals to move said fuel assembly grappling apparatus along said obtained shortest route based on said detected position of said fuel assembly grappling apparatus; and sending said control command signals to said driving means.

8. An automatic refueling method according to claim 7, further comprising the step of storing coordinates and an indication of the presence of a fuel assembly for each lattice of a fuel rack in said fuel pool, and coordinates and an indication of the presence of a fuel assembly for each fuel cell of said reactor core.

9. An automatic refueling method according to claim 7, further comprising controlling the motion of said fuel assembly grappling apparatus so that it passes not less than one predetermined point in said preset fuel transferring permitted region.

10. An automatic refueling method according to claim 9, further comprising selecting one of plural control modes in generating said control command signals, a control mode being selected for each of the intervals obtained by dividing said shortest route between said start point and said target terminal point, with each interval being designated by predetermined points.

* * * * *